Jan. 12, 1932. K. E. PORTER 1,841,150
PERCOLATOR STEAM LIP
Filed Nov. 26, 1930
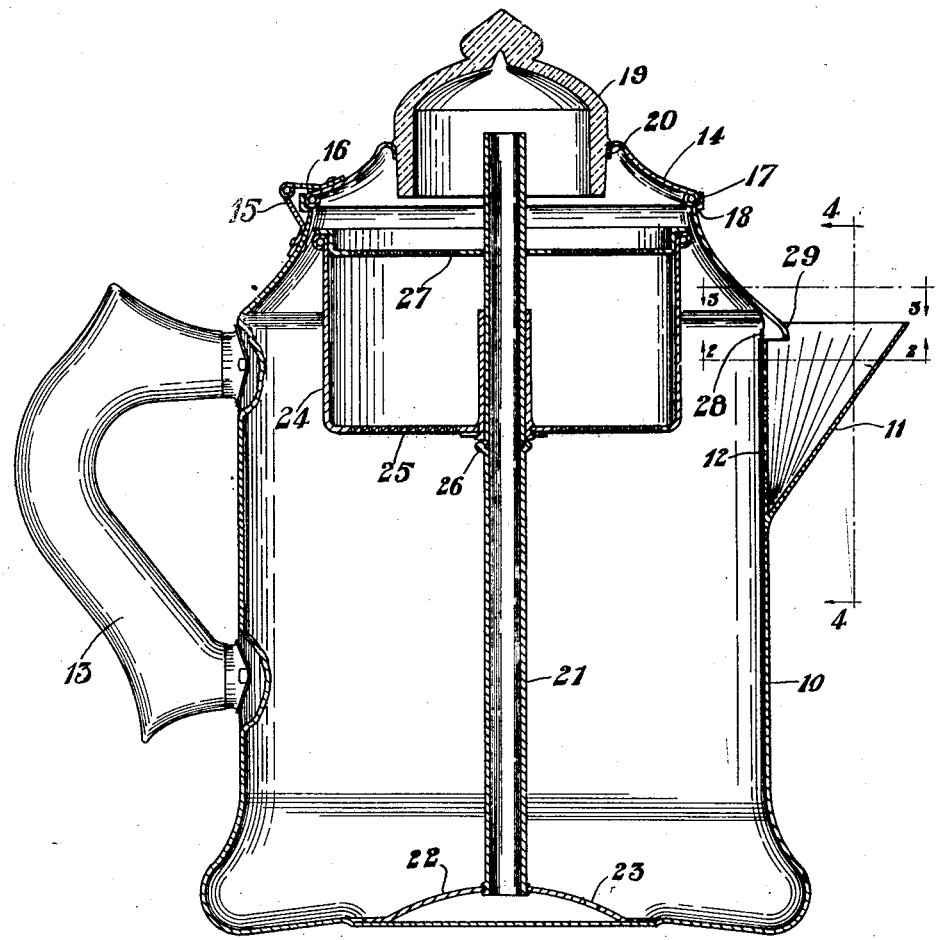
Fig. 1.
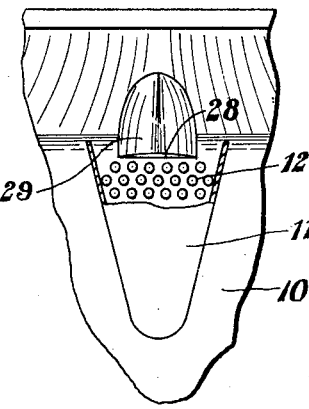
Fig. 4.
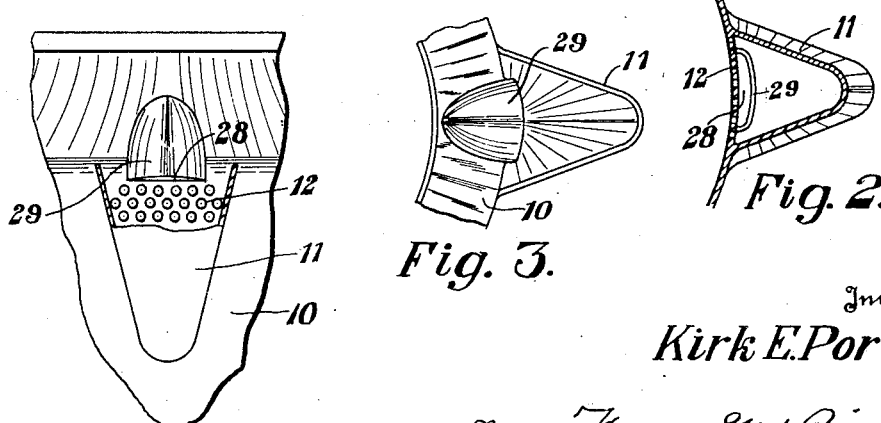
Fig. 3.
Fig. 2.
Inventor
Kirk E. Porter
By Frease and Bishop
Attorneys Patented Jan. 12, 1932

1,841,150

UNITED STATES PATENT OFFICE

KIRK E. PORTER, OF WOOSTER, OHIO, ASSIGNOR TO THE BUCKEYE ALUMINUM COMPANY, OF WOOSTER, OHIO, A CORPORATION OF OHIO

PERCOLATOR STEAM LIP

Application filed November 26, 1930. Serial No. 498,361.

The invention relates to percolators, coffee-pots and the like and more particularly to means for condensing steam in the upper portion of the pot and returning it through the spout to the interior of the percolator or pot.

In the operation of the ordinary percolator as the water within the lower portion of the pot boils, steam is generated therefrom and difficulty is often experienced due to the steam pressure passing up through the perforate bottom wall of the basket containing the ground coffee, this steam pressure interfering with the downward passage of the boiling water which is being sprayed through the ground coffee.

The object of the present improvement is to provide a steam vent in the upper portion of the percolator pot to relieve this steam pressure and overcome the above mentioned difficulty; the vent being provided with an overhanging depending lip located within the area of the spout, whereby the steam may be condensed and drained into the spout, from which it may run back into the interior of the percolator pot.

The above and other objects may be attained by providing an opening in the side wall of the percolator or pot within the area of the spout, and near the upper portion thereof, a lip overhanging said opening and arranged to direct steam back into the spout, the steam being condensed and dripping from said lip into the spout where it may trickle back into the interior of the pot.

An embodiment of the invention is illustrated in the accompanying drawings, in which Figure 1 is a vertical sectional view through a percolator provided with the improved steam lip;

Fig. 2, a fragmentary section through the spout below the steam lip, taken substantially on the line 2—2, Fig. 1;

Fig. 3, a section through the upper portion of the percolator above the spout and steam lip, taken substantially on the line 3—3, Fig. 1; and Fig. 4, a vertical section through the spout looking toward the steam lip, as on the line 4—4, Fig. 1.

Similar numerals refer to similar parts throughout the drawings.

The percolator may be of usual and well known construction, comprising the pot 10 having a spout 11 near its upper portion communicating with the interior of the pot through the perforations 12 formed in the side wall of the pot within the area of the spout in usual manner.

The side walls of the pot 10 preferably have a lower substantially vertical portion and an upper inwardly sloping portion.

The handle 13 may be attached to the side wall of the pot in any usual and well known manner at a point diametrically opposite to the spout for the purpose of manipulating the pot to pour the coffee therefrom.

The lid 14 may be of any usual construction, preferably hinged to the upper portion of the pot as at 15 and provided with a peripheral bead 16 which may be seated within the annular rim 17 and upon the shoulder 18 at the upper open end of the pot. This lid may have the usual glass dome 19 inserted through the central opening 20 thereof in order that the operation of the percolator may be visible.

The ordinary tube 21 is centrally located within the pot 10, having the inverted saucer-shaped base 22 provided with one or more openings 23 in order to permit the boiling water to enter the tube.

The basket 24 may be of usual and well known construction, having the perforated bottom wall 25 and adapted to be supported upon the upper portion of the tube 21 as by the annular shoulder 26 upon the tube.

The perforated spreader plate 27 may be provided to be placed upon the top of the basket in order to spread the boiling water over the ground coffee within the basket in the usual manner.

In percolating coffee in the device, the desired amount of ground coffee is placed in the basket 24 and the spreader plate 27 is placed thereon in the position shown in the drawings, the desired amount of water having previously been placed in the pot 10 below the bottom of the basket.

The percolator is then placed upon a burner or stove and as the water in the pot boils, it is forced up through the tube 21 in usual manner, descending upon the perforated spreader plate and passing down through the ground coffee within the basket, the coffee beverage formed by this leaching action dripping through the perforate bottom of the basket.

As the water in the pot boils, more or less steam pressure is created and it has been found that there is tendency for this steam pressure to pass up through the perforate bottom wall of the basket and interfere with the decending boiling water which is trickling through the ground coffee.

To relieve this steam pressure and at the same time to prevent loss in strength of the coffee which would be caused by wasting this steam, a slot or opening 28 is formed in the side wall of the pot within the area covered by the spout 11 and preferably just above the perforations 12.

A vent is thus formed to permit the escape of sufficient steam to relieve the pressure within the pot and overcome the difficulty above pointed out.

In order that the steam passing through this vent may be returned to the pot, an overhanging depending lip 29 is formed over the vent 28, the steam having a tendency to condense upon said lip, from which the condensation drips into the spout 11 and then drains back into the interior of the pot.

I claim:

1. A percolator including walls forming a pot, a spout on one side wall of the pot, the portion of the side wall within the spout being provided with perforations forming a communication between the interior of the pot and the spout and with a steam vent above said perforations, and a lip overhanging said steam vent and extending into the spout for condensing steam passing through the vent and draining the condensation into said spout.

2. A percolator including walls forming a pot, a spout on one side wall of the pot communicating with the interior of the pot, the portion of the side wall within the spout having a steam vent opening into the upper portion of the spout and a lip overhanging said steam vent and extending into the spout for condensing steam passing through the vent and draining the condensation into said spout.

3. A percolator including a pot having side walls, the side walls having a lower substantially vertical portion and an upper inwardly sloping portion, a spout on the vertical portion adjacent the inwardly sloping portion and provided with perforations forming a communication between the interior of the pot and the spout, said inwardly sloping portion having a vent formed therein communicating with the spout, and said vent having a lip portion extending into the spout.

4. A percolator including a pot having side walls, the side walls having a lower substantially vertical portion and an upper inwardly sloping portion, a spout on the vertical portion adjacent the inwardly sloping portion and communicating with the interior of the pot, said inwardly sloping portion being pressed outwardly at its jointure with the vertical portion to form a vent communicating between the interior of the pot and the spout, said vent having an overhanging lip portion extending into the spout.

In testimony that I claim the above, I have hereunto subscribed my name.

KIRK E. PORTER.